(12) United States Patent
Floresca et al.

(10) Patent No.: US 11,108,435 B2
(45) Date of Patent: Aug. 31, 2021

(54) INDUCTIVE POWER RECEIVER

(71) Applicant: Apple Inc., Cupertino, CA (US)

(72) Inventors: Ron Rafer Floresca, Auckland (NZ); Arunim Kumar, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/579,169

(22) PCT Filed: Jun. 1, 2016

(86) PCT No.: PCT/NZ2016/050090
§ 371 (c)(1),
(2) Date: Dec. 1, 2017

(87) PCT Pub. No.: WO2016/195514
PCT Pub. Date: Dec. 8, 2016

(65) Prior Publication Data
US 2018/0131411 A1    May 10, 2018

Related U.S. Application Data

(60) Provisional application No. 62/234,550, filed on Sep. 29, 2015, provisional application No. 62/170,340, filed on Jun. 3, 2015.

(51) Int. Cl.
*H04B 5/00* (2006.01)
*H02J 50/10* (2016.01)
*H02J 50/80* (2016.01)

(52) U.S. Cl.
CPC ........... *H04B 5/0037* (2013.01); *H02J 50/10* (2016.02); *H02J 50/80* (2016.02); *H04B 5/0031* (2013.01); *H04B 5/0075* (2013.01)

(58) Field of Classification Search
CPC ... H04B 5/0037; H04B 5/0031; H04B 5/0075
USPC ........................................................ 455/41.1
See application file for complete search history.

(56) References Cited

U.S. PATENT DOCUMENTS

| | | | | |
|---|---|---|---|---|
| 8,497,658 | B2 * | 7/2013 | Von Novak | H02J 50/20 |
| | | | | 320/108 |
| 8,798,537 | B2 * | 8/2014 | Lee | H02J 50/60 |
| | | | | 455/41.1 |
| 9,030,051 | B2 * | 5/2015 | Muratov | H02J 50/80 |
| | | | | 307/104 |
| 9,035,603 | B2 * | 5/2015 | Endo | H02J 7/00045 |
| | | | | 320/108 |
| 9,118,357 | B2 * | 8/2015 | Tseng | H04B 5/0037 |
| 9,325,187 | B2 * | 4/2016 | Lee | H02J 50/70 |
| 9,362,755 | B2 * | 6/2016 | Khandelwal | H03K 5/1536 |
| 9,362,756 | B2 * | 6/2016 | Khandelwal | H04B 5/0093 |

(Continued)

FOREIGN PATENT DOCUMENTS

| | | |
|---|---|---|
| CN | 103427499 A | 12/2013 |
| CN | 103460615 A | 12/2013 |

(Continued)

*Primary Examiner* — April G Gonzales
(74) *Attorney, Agent, or Firm* — Blank Rome LLP

(57) ABSTRACT

An inductive power receiver including a switch mode regulator to control the power flow from a power receiving coil and a modulator to communicate to an inductive power transmitter via the power receiving coil. The switch mode regulator operates in a different modes during transmitting and non-transmitting periods.

19 Claims, 8 Drawing Sheets

(56) References Cited

U.S. PATENT DOCUMENTS

| | | | | |
|---|---|---|---|---|
| 9,413,175 B2* | 8/2016 | Park | ................ | H02J 50/70 |
| 9,520,739 B2* | 12/2016 | Endo | ................ | H02J 7/025 |
| 9,735,584 B2* | 8/2017 | Taylor | ................ | H02J 50/80 |
| 9,838,084 B2* | 12/2017 | Khandelwal | ............ | H04L 27/10 |
| 9,843,196 B2* | 12/2017 | Kwak | ................ | H02J 7/00308 |
| 9,853,504 B2* | 12/2017 | Neidorff | ................ | H02J 50/10 |
| 9,973,238 B2* | 5/2018 | Pletcher | ................ | H02J 50/10 |
| 2004/0056091 A1* | 3/2004 | Overhultz | ............. | G06Q 30/02 |
| | | | | 235/382 |
| 2004/0145452 A1* | 7/2004 | Fischer | .............. | G06K 19/0723 |
| | | | | 340/10.1 |
| 2005/0040885 A1* | 2/2005 | Hayashi | ................ | G05F 3/30 |
| | | | | 327/543 |
| 2008/0197193 A1* | 8/2008 | Overhultz | ............. | G06Q 20/201 |
| | | | | 235/383 |
| 2008/0200119 A1* | 8/2008 | Onishi | ................ | H02J 50/12 |
| | | | | 455/41.1 |
| 2009/0117864 A1* | 5/2009 | Cassia | ................ | H04B 1/0057 |
| | | | | 455/127.1 |
| 2010/0171369 A1* | 7/2010 | Baarman | ............. | H04B 5/0037 |
| | | | | 307/104 |
| 2010/0182016 A1* | 7/2010 | Hild | ................ | H01H 9/167 |
| | | | | 324/635 |
| 2012/0146425 A1* | 6/2012 | Lee | ................ | H04B 5/0025 |
| | | | | 307/104 |
| 2012/0235636 A1* | 9/2012 | Partovi | ................ | H02J 5/005 |
| | | | | 320/108 |
| 2012/0242160 A1* | 9/2012 | Tseng | ................ | H04B 5/0037 |
| | | | | 307/104 |
| 2013/0249479 A1* | 9/2013 | Partovi | ................ | H04B 5/0087 |
| | | | | 320/108 |
| 2013/0285604 A1* | 10/2013 | Partovi | ................ | B60L 53/122 |
| | | | | 320/108 |
| 2013/0285605 A1* | 10/2013 | Partovi | ................ | H04B 5/0081 |
| | | | | 320/108 |
| 2013/0300204 A1* | 11/2013 | Partovi | ................ | H02J 50/50 |
| | | | | 307/104 |
| 2014/0042681 A1* | 2/2014 | Kooney | ................ | B25B 11/00 |
| | | | | 269/8 |
| 2014/0300198 A1* | 10/2014 | Wakabayashi | ........ | H01F 27/006 |
| | | | | 307/104 |
| 2015/0054355 A1* | 2/2015 | Ben-Shalom | ...... | G05B 13/0205 |
| | | | | 307/104 |
| 2015/0057923 A1* | 2/2015 | Han | ................ | G08G 1/096827 |
| | | | | 701/465 |
| 2015/0108847 A1* | 4/2015 | Taylor | ................ | H02J 5/005 |
| | | | | 307/104 |
| 2015/0372662 A1* | 12/2015 | Niessen | ................ | H04B 5/0037 |
| | | | | 307/104 |

FOREIGN PATENT DOCUMENTS

| | | |
|---|---|---|
| CN | 103999325 A | 8/2014 |
| JP | 2010178473 A | 8/2010 |
| JP | 2010259172 A | 11/2010 |
| JP | 2011229265 A | 11/2011 |
| JP | 2012244778 A | 12/2012 |
| WO | 2013070094 A2 | 5/2013 |
| WO | 2014042681 A2 | 3/2014 |
| WO | 2015057923 A1 | 4/2015 |
| WO | WO-2015057923 A1 * | 4/2015 ............. H02J 50/60 |

* cited by examiner

INDUCTIVE POWER RECEIVER

FIELD

This invention relates generally to an inductive power receiver.

BACKGROUND

Backscatter communication is a technique where a device receives an electromagnetic signal and reflects part of the signal back. The reflected signal is encoded with data, allowing the device to communicate. This is used in various devices, such as RFID tags, which may not have an on-board power source.

Another example of the use of backscatter communication is in the context of inductive power transfer (IPT) systems. IPT systems are a well-known area of established technology (for example, wireless charging of electric toothbrushes) and developing technology (for example, wireless charging of handheld devices on a 'charging mat'). Typically, a primary side generates a time-varying magnetic field from a transmitting coil or coils. This magnetic field induces an alternating current in a suitable receiving coil that can then be used to charge a battery, or power a device or other load.

For example, communication between the power receiver and the power transmitter in the form of backscatter communication from the receiver of the magnetic field produced by the transmitter using so-called Amplitude Shift Keying (ASK) has been conventionally proposed.

In ASK, the power receiver effectively digitally modulates the amount of power drawn from the power signal from the power transmitter according to the data to be communicated. The power transmitter detects this modulation of the current through and/or the voltage across the power transmitter coil(s). In other words, the power receiver and power transmitter use an ASK-based backscatter channel to communicate. The backscatter communications approach is particularly beneficial in wireless power transfer applications because the approach does not require additional radio transceiver modules and because the range of communications is more or less constrained to the range of power transmission. Because the backscatter data transmission is so localized in space, a power receiver can be easily matched up with its data transmissions, even in cases where many power receivers and transmitters are operating nearby.

Ordinarily, the transmitting coils are driven by a converter. The characteristics of the driving current (such as frequency, phase and magnitude) will be related to the particular IPT system. In some instances, it may be desirable for the driving frequency of the converter to match the resonant frequency of the resonant transmitting coil and/or the resonant receiving coil.

Some inductive power systems use a backscatter communications channel to allow an inductive power receiver to communicate load requirements to the primary side. For example, changes to the magnitude of the power transmitter coil current, its voltage and/or its frequency may be requested by a power receiver in order to correspond with the load requirements of that power receiver. This is known as primary side regulation and can help to regulate the output voltage or current from the receiver. Further uses for a backscatter communications channel can include foreign object detection, receiver authentication and reporting the status of a battery being charged, among others. In order to communicate from the power receiver to the power transmitter, some wireless power interoperability standards require a backscatter communications channel, such as the Qi standard by the Wireless Power Consortium (WPC).

A problem with the backscatter communications channel in wireless power systems is that the channel can be very susceptible to changes in the inductive power transfer system. When inadvertently superimposed on top of the deliberate backscatter modulation, these system changes can be, to the receiver of the backscatter message, indistinguishable from deliberate modulation, and can therefore cause the original message to become corrupted or lost entirely.

The present invention may provide an improved inductive power transfer receiver, or at least provides the public with a useful choice.

SUMMARY

According to one example embodiment there is provided an inductive power receiver comprising:
  a power receiving coil;
  a switch mode regulator configured to control the power flow from the power receiving coil; and
  a modulator configured to communicate to an inductive power transmitter via the power receiving coil during one or more transmitting periods and not communicate during one or more non-transmitting periods;
  wherein the switch mode regulator operates in a first mode during the non-transmitting period and a second different mode during the transmitting period.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1:
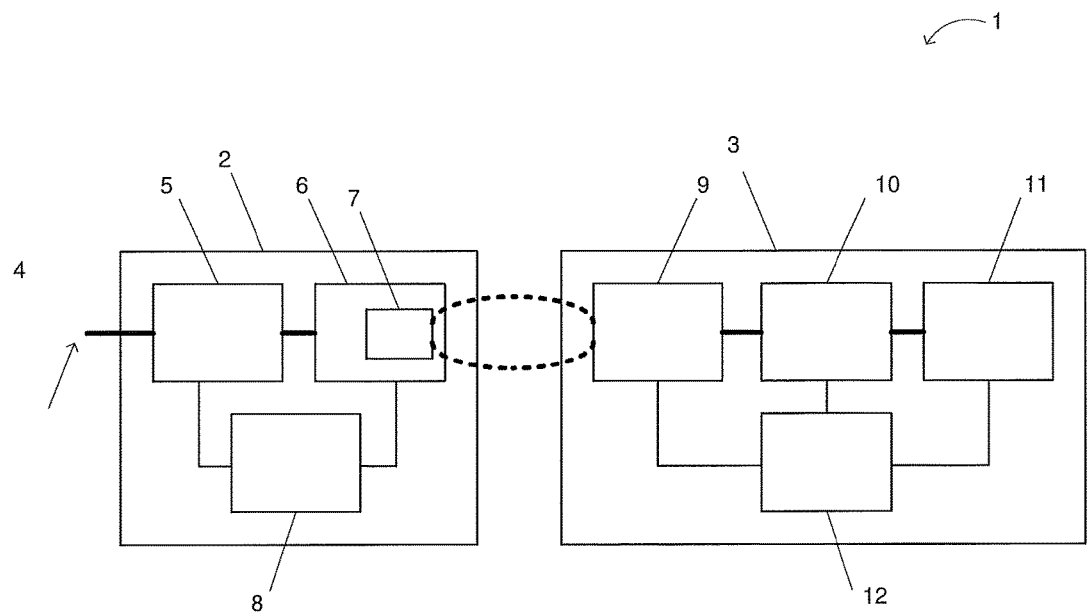
FIG. 1 is a schematic diagram of an inductive power transfer system.

An inductive power transfer (IPT) system 1 is shown generally in FIG. 1. The IPT system includes an inductive power transmitter 2 and an inductive power receiver 3. The inductive power transmitter 2 is connected to an appropriate power supply 4 (such as mains power or a battery). The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the inductive power transmitter 2. The controller 8 may be adapted to receive inputs from each part of the inductive power transmitter 2 and produce outputs that control the operation of each part. The controller 8 may be implemented as a single unit or separate units, configured to control various aspects of the inductive power transmitter 2 depending on its capabilities, including for example: power flow, tuning, selectively energising transmitting coils, inductive power receiver detection and/or communications. There may also be a separate communications module.

The inductive power receiver 3 includes a receiving coil or coils 9 connected to receiver circuitry which may include power conditioning circuitry 10 that in turn supplies power to a load 11. When the coils of the inductive power transmitter 2 and the inductive power receiver 3 are suitably coupled, the alternating magnetic field generated by the transmitting coil or coils 7 induces an alternating current in the receiving coil or coils 9. The power conditioning circuitry 10 is configured to convert the induced current into a form that is appropriate for the load 11, and may include for example a power rectifier, a power regulation circuit, or a combination of both. The receiving coil or coils 9 may be connected to capacitors (not shown) either in parallel or series to create a resonant circuit. In some inductive power receivers, the receiver may include a controller 12 which may control tuning of the receiving coil or coils 9, operation of the power conditioning circuitry 10 and/or communications. There may also be a separate communications module.

It is understood that the use of the term "coil" herein is meant to designate inductive "coils" in which electrically conductive wire is wound into three dimensional coil shapes or two dimensional planar coil shapes, electrically conductive material fabricated using printed circuit board (PCB) techniques into three dimensional coil shapes over plural PCB 'layers', and other coil-like shapes. The use of the term "coil", in either singular or plural, is not meant to be restrictive in this sense.

Messages from the inductive power receiver 3 to the inductive power transmitter 2 can be sent using a backscatter communications channel. In an example embodiment the voltage across and the current through the receiving coil or coils 9 is amplitude modulated by, or under control of, the controller 12 or a communications module, in accordance with a data stream. This modulation is then observed as voltage or current amplitude variation in transmitting coil or coils 7 and can be demodulated by the inductive power transmitter 2, so that the original data stream can be recovered. Among other uses, this backscatter communications channel can be used to enable primary side regulation without the need for dedicated radio transceivers. Primary side control mediated by a backscatter communications channel is sometimes necessary in order to meet wireless power interoperability standards.

A problem with relying on primary side regulation alone to regulate the output from an inductive power receiver 3 is that primary side regulation can be slow to respond when the IPT system 1 begins to fall out of regulation. This is particularly a problem when sudden changes occur in the IPT system 1 such as loading transients or changes in the coupling factor between the transmitting coil or coils 7 and the receiving coil or coils 9, and could result in the load 11 being either over-voltage or under-voltage.

As a partial solution to these problems, in addition to using primary side regulation facilitated by a backscatter communications channel, an IPT system 1 may use a simple linear regulator on the inductive power receiver 3 to provide additional, fast-acting regulation of the power supplied to load 11. In this way, a combination of the efficiency of primary side regulation and the speed and precision of secondary side regulation can be achieved.

Figure 2:
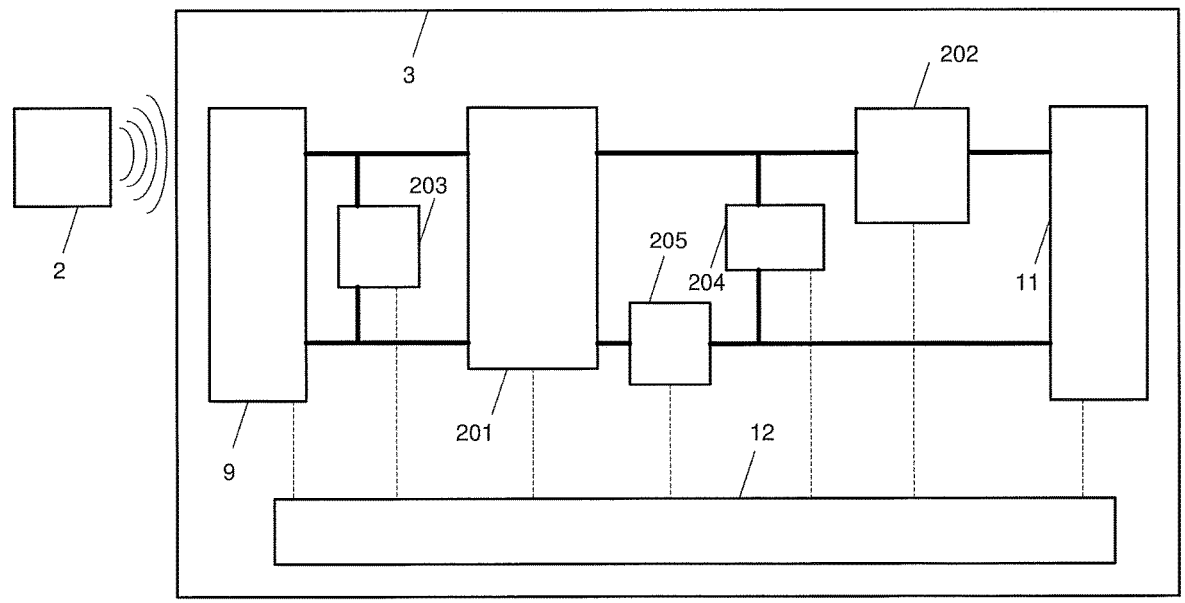
FIG. 2 is a receiver capable of backscatter communications and with a linear regulator for power flow control.

FIG. 2 is a block diagram of an inductive power receiver capable of backscatter communications and with a linear regulator for power flow control. Inductive power transmitter 2 transmits power to receiving coil or coils 9. The receiving coil or coils 9 are connected to a rectifier 201, which can for example be a synchronous rectifier, and can be connected in full bridge and in half bridge configurations. Rectifier 201 is connected to linear regulator 202, which regulates the received DC voltage so that it is suitable for load 11. An AC-side modulator 203 and a DC-side modulator 204 are used to amplitude modulate the current in or voltage across receiving coil or coils 9, in order to send backscatter messages to the inductive power transmitter 2. Sometimes, only one of these two modulator circuits are necessary for the backscatter communications channel to function, and their placement within the inductive power receiver 3 may vary. Current sensing circuit 205 is used to monitor the current drawn by the load 11. Each part of the inductive power receiver 3 can be monitored and/or controlled by controller 12. If primary side regulation is used, the inductive power transmitter 1 will vary its frequency, amplitude or duty cycle, or any combination of these, in order to help regulate the voltage or current received by receiving coil or coils 9. Communication from the inductive power transmitter 2 to an inductive power receiver 3 may for example be achieved using frequency modulation of the switching frequency of the inductive power transmitter 2.

Receiving coil or coils 9 be part of a dual-resonant circuit, that is, a circuit tuned to resonate at two different frequencies. One of these frequencies is designed to be the IPT frequency eg: 110 kHz and the other frequency is so that inductive power receivers 3 may be detected, which may be required by some inductive power transmitters 2 eg: 1 MHz. Typically these two frequencies should be sufficiently separated. The dual resonant circuit of the inductive power receiver 3 may comprise a receiving coil 9 and two resonant capacitances (not shown). The purpose of the first resonant capacitance is to enhance the power transfer efficiency. The purpose of the second resonant capacitance is to enable a resonant detection method.

The linear regulator 202 may be a low drop-out ("LDO") type. In some cases, linear regulator 202 can function as, may include or be replaced by a load disconnect switch. A load disconnect switch may be necessary according to some wireless power interoperability standards for inductive power receivers 3. The inductive power receiver 3 may be designed to draw enough power that backscatter communications is still possible even when the load 11 is disconnected.

There is increasing interest in IPT systems 1 in which the inductive power transmitter 2 includes one or an array of transmitter coils beneath a charging surface (commonly referred to as "charging mats"). In certain applications with multiple inductive power receivers 3 placed on a charging mat, secondary side regulation may be used. This enables each inductive power receiver 3 to independently control its own received power, voltage or current. A single inverter 6 in the inductive power transmitter 2 may thereby power multiple inductive power receivers 3, each of which may have a different position, orientation, output voltage, loading, sleeve and/or design from the others. Use of secondary side regulation can decrease the bulk and component count of inductive power transmitter 2.

The use of linear regulation to perform secondary side regulation in a receiver can be efficient so long as the voltage drop on linear regulator 202 is not too great. In some IPT systems, including some charging mats, it may be desirable that individual inductive power receivers 3 are able to regulate the received voltage from a high level down to a significantly lower level or step-up their voltage, or change the received power in some other way. Using linear regulation in these cases may not be efficient or even possible. The linear regulator 202 may be either supplemented with or replaced by a switch mode regulator. An example of this is shown in FIG. 3.

Figure 3:
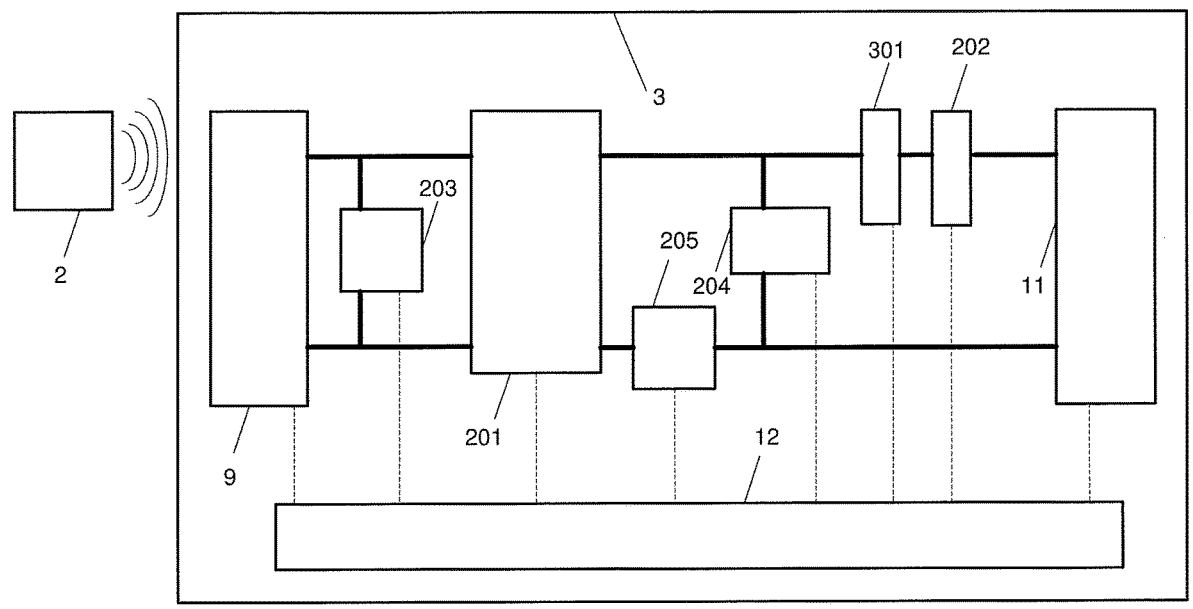
FIG. 3 is a receiver capable of backscatter communications and with a switch mode regulator for power flow control.

FIG. 3 shows an example embodiment an inductive power receiver 3 capable of backscatter communications and with a switch mode regulator 301 for power flow control. FIG. 3 builds on the circuit described in FIG. 2. A linear regulator 202 and/or a load disconnect switch may also be used in combination with the switch mode regulator 301, or may be omitted. Many different regulator types are possible for switch mode regulator 301, including but not limited to buck, boost, buck-boost, "coupled coil", and a regulator of the types described in U.S. patent No. 62/109,552 filed 29 Jan. 2015, the contents of which are incorporated herein by reference. For example, regulators that create an AC voltage in series with the receiving coil so as to regulate the AC power from the receiving coil may be possible for switch mode regulator 301. Some switch mode regulators 301 vary their duty cycle in order to change their control effort and thereby regulate their output voltage or current. Other regulator types vary their operating frequency or some other parameter in order to regulate their output voltage or current. Any of these may be possible for switch mode regulator 301.

A coupled coil regulator uses a tertiary coil coupled to receiving coil or coils 9. This tertiary coil may then be shorted, opened, or the impedance across its terminals otherwise modified in order to control the power, voltage and/or current developed by receiving coil or coils 9.

The position of the switch mode regulator 301 within the inductive power receiver 3 will depend on the type of switch mode regulator used, and the position shown in FIG. 3 is only an example of a possible placement location. For example, the regulator is on the AC side of rectifier 201 and in series with the coil or coils 9 if a BPR regulator is used, and magnetically coupled with the coil or coils 9 if a coupled coil regulator is used. The position of the switch mode regulator 301 shown in FIG. 3 could correspond to a buck regulator, a boost regulator, or a buck-boost regulator for example.

Figure 4:
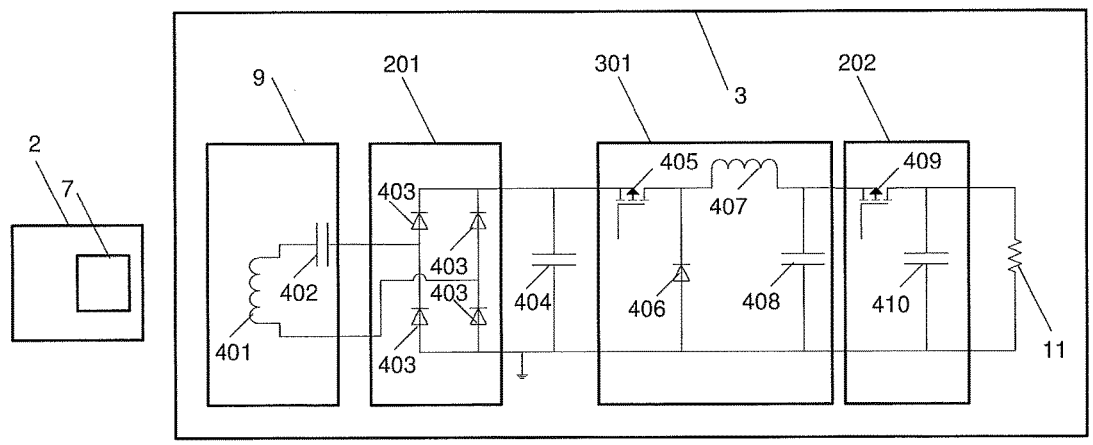
FIG. 4 is a circuit diagram of a receiver that has a buck switch mode converter.

FIG. 4 is a simplified circuit diagram which shows an embodiment of the invention using a buck regulator as switch mode regulator 301. Receiving coil or coils 9 comprise receiving coil 401 and tuning capacitor 402. Rectifier 201 comprises four of rectifier diodes 403 or synchronous rectifiers, connected in a full bridge configuration. Intermediate DC capacitor 404 smoothens voltage from rectifier 201 so that switch mode regulator 301 has an approximately DC input voltage. The switch mode regulator 301 is connected in a buck configuration and comprises MOSFET 405, which may be a PMOS FET, freewheeling diode 406, DC inductor 407 and intermediate DC capacitor 408. Linear regulator 202 comprises MOSFET 409, which may be a PMOS FET and which may also be used as a load disconnect switch. The AC-side modulator 203, the DC-side modulator 204 and the current sensing circuit 205 are not shown in this figure.

Figure 5:
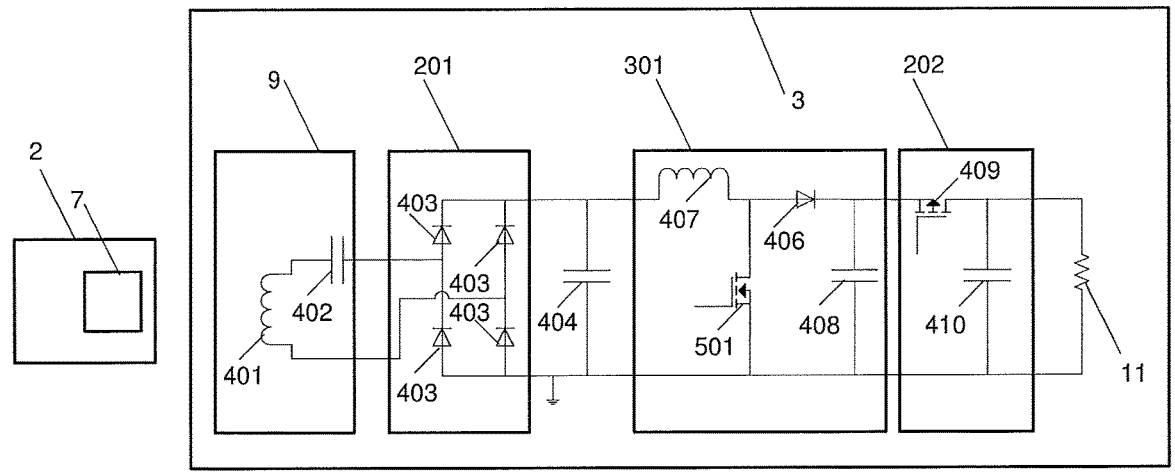
FIG. 5 is a circuit diagram of a receiver that has a boost switch mode converter.

FIG. 5 is a simplified circuit diagram which shows an embodiment of the invention using a boost regulator as switch mode regulator 301. The switch mode regulator 301 is connected in a boost configuration and comprises MOSFET 501, which may be an NMOS FET, freewheeling diode 406, DC inductor 407 and intermediate DC capacitor 408. The AC-side modulator 203, the DC-side modulator 204 and the current sensing circuit 205 are not shown in this figure.

Figure 6:
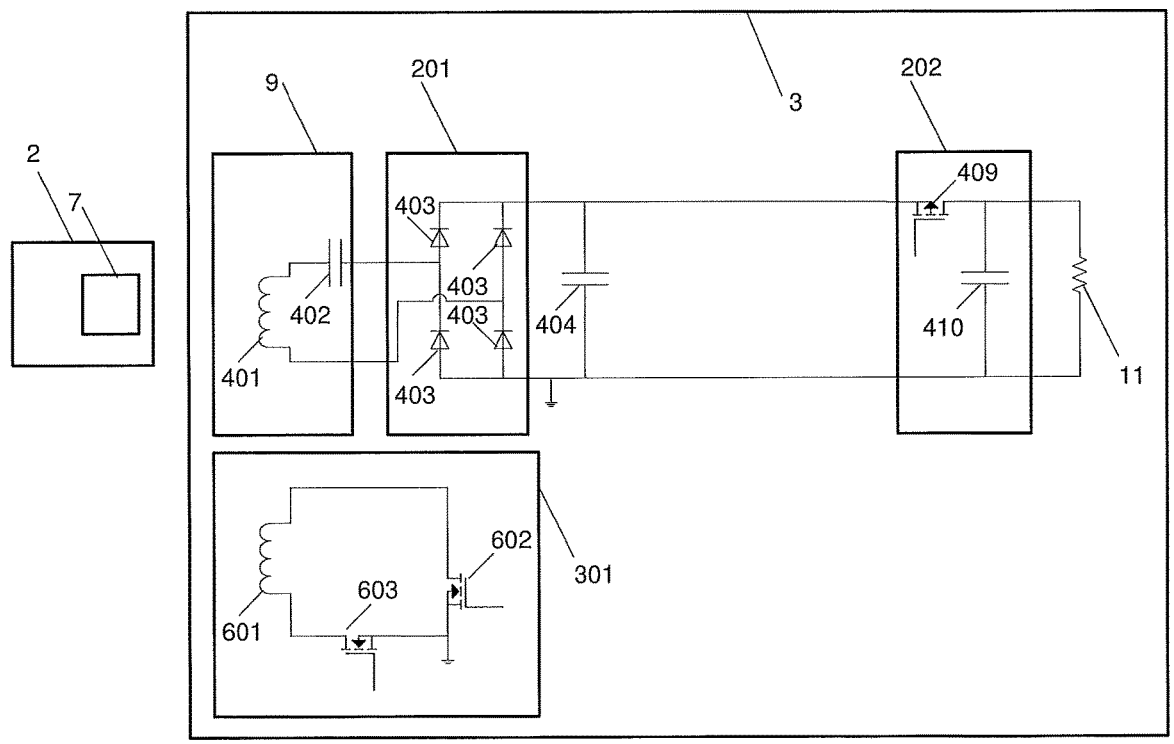
FIG. 6 is a circuit diagram of a receiver that has a coupled coil switch mode converter.

FIG. 6 is a simplified circuit diagram which shows an embodiment of the invention using a coupled coil regulator as switch mode regulator 301. In this embodiment, the position of the switch mode regulator 301 is different from that shown in FIG. 3. The coupled coil switch mode regulator 301 has a tertiary coil 601 which is well coupled to receiving coil 401. By selectively allowing and blocking current flow through the tertiary coil 601 using MOSFET 602 and MOSFET 603, the amount of magnetic flux which can enter receiving coil 401 can be controlled, thereby controlling the current flow through rectifier 201 and the voltage across intermediate DC capacitor 404. In one embodiment, the tertiary coil 601 have the same turns as of the receiving coil 401 (wound bifilar and inductance are almost the same) and a coupling coefficient to the receiving coil 401 of >0.9. Both the tertiary coil 601 and the receiving coil 401 may have a coupling coefficient to the transmitting coil or coils 7 between 0.3-0.7.

The switch mode regulator 301 may include a bypass switch or switches which can be used to bypass or switch off the regulator, or to connect its input and output together. For example, a bypass switch may be connected in parallel with the input and output connections of a buck regulator, in order to connect the input directly to the output. A buck regulator can also be bypassed by turning ON the MOSFET 405 for the bypass period. A boost regulator can be bypassed by placing a switch connected in parallel with the input and output of the regulator or by turning MOSFET 501 OFF for the bypass period. In the case of a coupled coil regulator, since the tertiary coil 601 is not connected in series with receiving coil 401, a bypass can be implemented by turning MOSFET 602 and MOSFET 603 OFF, so no current can flow through tertiary coil 601. This causes the control effort of the coupled coil regulator to become zero.

Using the circuit shown in FIG. 3, it is possible for each inductive power receiver 3 to efficiently regulate its own output voltage or current, independently of the magnitude of the magnetic field received by the power receiving coil or coils 9. Because efficient secondary side regulation is now available to the IPT system 1, primary side regulation is no longer completely necessary. However, using primary side and secondary side regulation in combination may further help to improve the efficiency of the IPT system 1. As such, having a backscatter communications channel to allow the inductive power receiver 3 to communicate its power requirements to a wireless power transmitter 2 is useful. Moreover, in order to meet certain wireless power interoperability standards, a backscatter communications channel may be required.

The backscatter communications channel may be disrupted when a switch mode regulator 301 is used in the inductive power receiver 3. This can happen because when the switch mode regulator 301 corrects the output voltage across load 11, for example by changing its duty cycle, the switch mode regulator 301 also modulates the current flowing in and/or the voltage across receiving coil or coils 9. This can corrupt a message being sent on the backscatter communications channel. A switch mode regulator 301 is typically more disruptive to the backscatter communications channel than a linear regulator 202 of the same voltage and current output capacity. This can be for example because there is no switching action in the case of linear regulators.

If the duty cycle or the control effort of the switch mode regulator 301 is kept constant while a message is being sent on the backscatter communications channel, the disruption to the channel may be minimized and the message may be less likely to be corrupted. The switch mode regulator 301 may be configured to temporarily maintain its duty cycle or control effort when the backscatter communications channel sends a message. This may maintain the integrity of the backscatter communications channel while benefiting from the high efficiency regulation properties of the switch mode regulator 301.

If the duty cycle of the switch mode regulator 301 is held constant or the control of switch mode regulator 301 restricted in some other way, for example, bypassed, the voltage or current supplied to load 11 may fall out of regulation. This only happens while messages are being sent because it is only during this period that switch mode regulator 301 must restrict sudden changes to its duty cycle. This can be corrected by linear regulator 202. The average losses on the linear regulator 202 may be insignificant even if the linear regulator 202 must significantly step-down the voltage, as long as the proportion of time spent by the linear regulator 202 in this state is low. For example, the linear regulator 202 may be controlled to have an insignificant voltage drop from input to output when messages are not being sent on the backscatter channel, and to only step down the voltage when a message is being sent. The switch mode regulator 301 can therefore reduce the average voltage drop across the linear regulator 202 in order to minimize overall power losses in inductive power receiver 3.

The linear regulator 202 can be made to act like a closed switch if the target output voltage of the linear regulator 202 is made to be higher than its input voltage, in which case the linear regulator 202 may just pass its input voltage to its output terminal with minimal voltage drop. This is useful for periods where regulation is being done by the switch mode regulator 301. To do this the output voltage of the switch mode regulator 301 can be selected as to be lower than the output voltage of the linear regulator 202 so that the linear regulator 202 will act like a closed switch when switch mode regulator 301 is regulating, and as a normal linear regulator when switch mode regulator 301 is not regulating.

By using a combination of the switch mode regulator 301 and the linear regulator 202 in the power receiver 3, secondary side regulation, high average efficiency, rapid regulator response time, tight regulation accuracy and/or a reliable backscatter communications channel may be achieved within the same IPT system 1.

Figure 7:
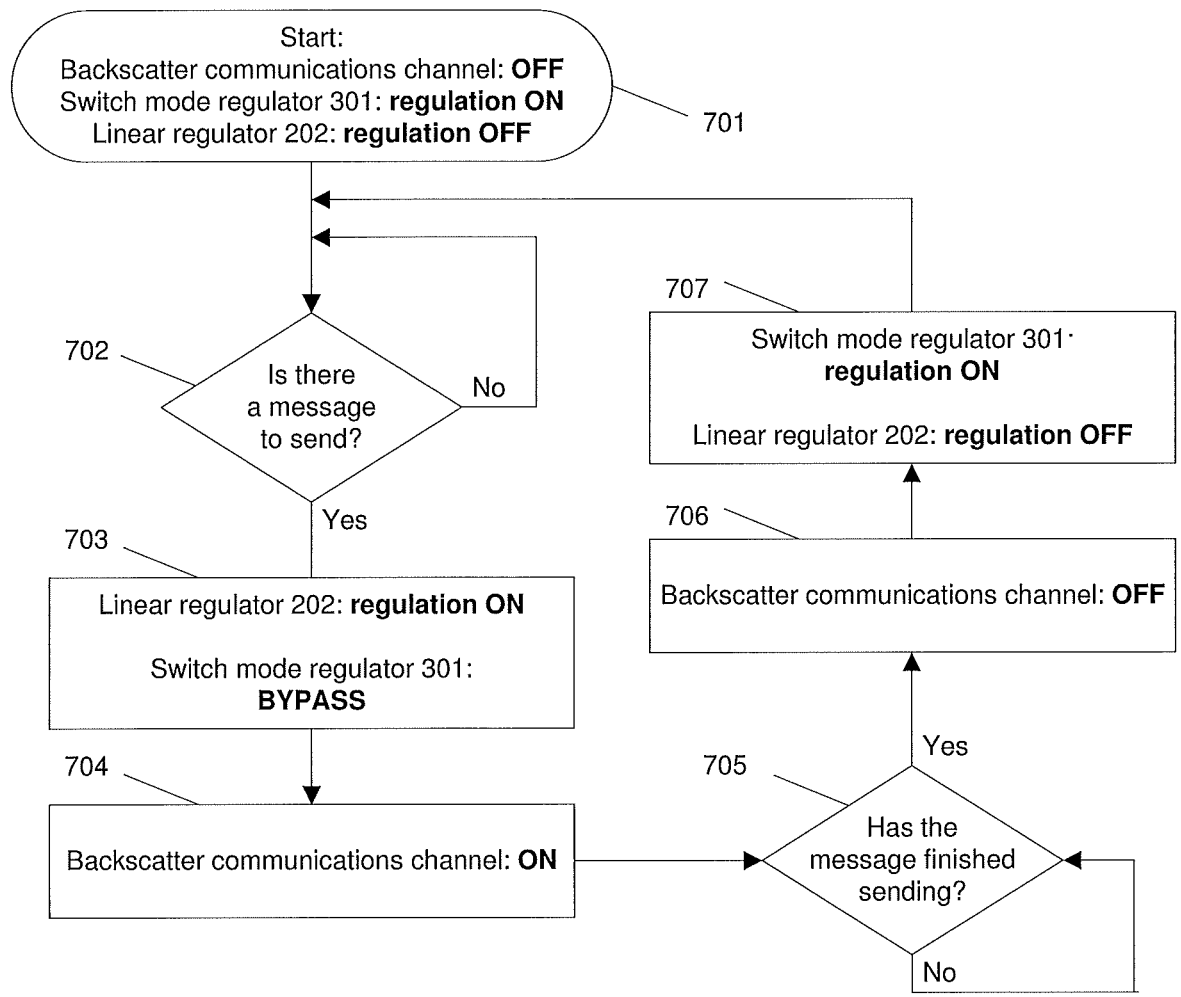
FIG. 7 is a flow diagram for a first regulator locking method.

FIG. 7 shows a first control method for preventing the switch mode regulator 301 from affecting the backscatter communications channel. It follows these steps:

Initially, in step 701, while no messages are being sent on the backscatter communications channel, switch mode regulator 301 runs in a first mode, regulating the voltage or current delivered to load 11. Linear regulator 202 is exerting minimal control effort. The inductive power receiver 3 now waits in step 702 for any messages that need to be sent.

Immediately prior to sending a message on the backscatter communications channel, in step 703, switch mode regulator 301 begins to operate in a second mode wherein regulation using the switch mode regulator 301 is bypassed. For some types of switch mode regulator 301, such as a buck regulator, bypassing can involve connecting the input terminals of the switch mode regulator 301 to the output terminals using a switch. For other types of switch mode regulator 301, such as a boost regulator or coupled coil regulator, bypassing can involve disconnecting part of the switch mode regulator 301 using a switch. When the switch mode regulator 301 is bypassed, current can flow from the receiving coil or coils 9 to the load without being inhibited by switch mode regulator 301. The linear mode regulator may be regulating the output voltage to the load 11 at this time.

While regulation with the switch mode regulator 301 is disabled, the backscatter communications channel can be turned on in step 704 and a message can be sent, in step 705.

Once the backscatter message is sent, the backscatter communications channel is turned OFF in step 706. Following this, in step 707, regulation by the switch mode regulator 301 is re-enabled and returns to operating in the first mode and the linear regulator 202 returns to exerting minimal control effort.

The inductive power receiver 3 can then wait again in step 702 for any messages that need to be sent.

Figure 8:
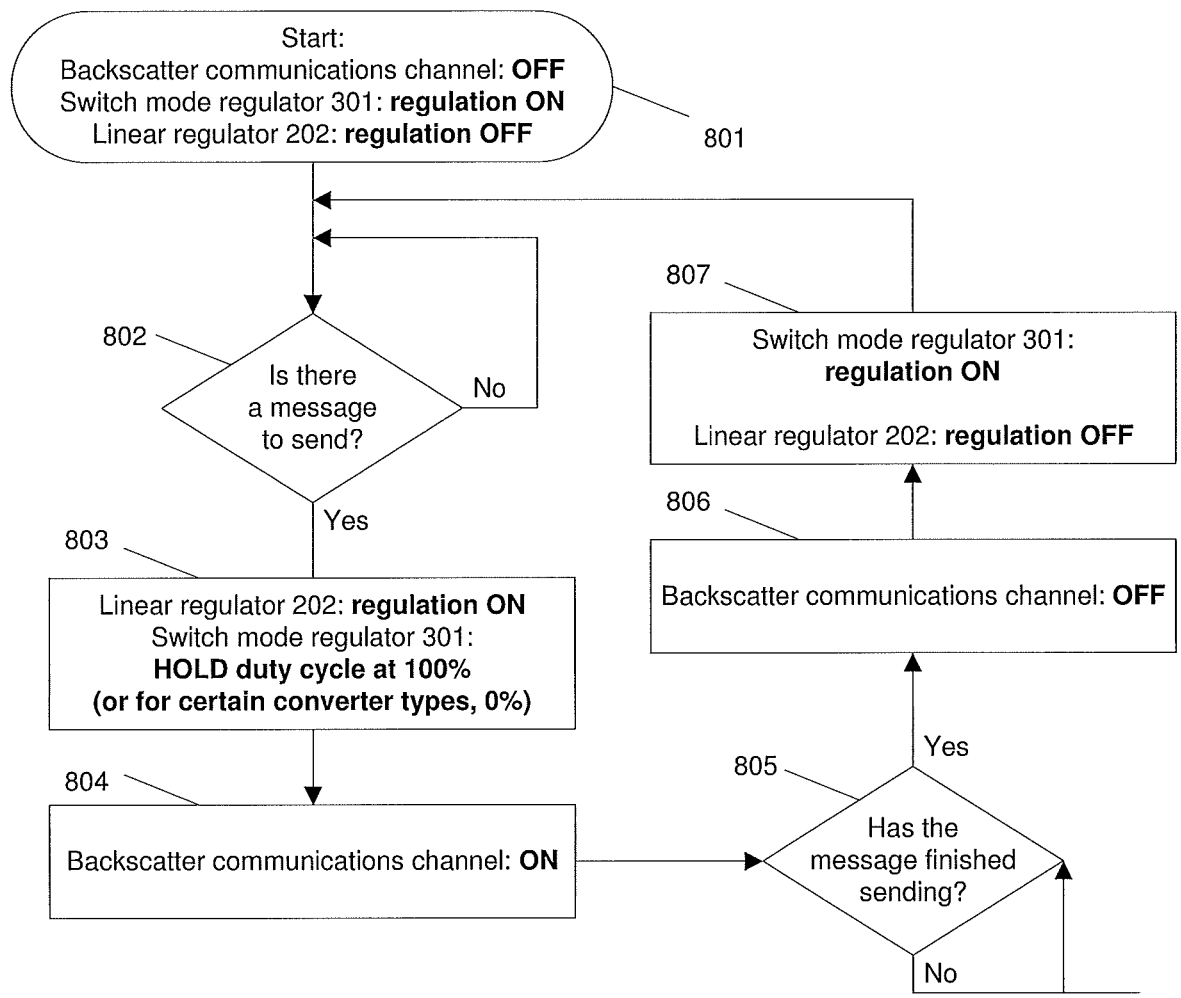
FIG. 8 is a flow diagram for a second regulator locking method.

FIG. 8 shows second control method for preventing the switch mode regulator 301 from affecting the backscatter communications channel. It follows these steps:

Initially, in step 801, while no messages are being sent on the backscatter communications channel, switch mode regulator 301 runs in a first mode, regulating the voltage or current delivered to load 11. Linear regulator 202 is exerting minimal control effort. The inductive power receiver 3 now waits in step 802 for any messages that need to be sent.

Immediately prior to sending a message on the backscatter communications channel, in step 803, switch mode regulator 301 begins to operate in a second mode wherein regulation is disabled. This can be achieved by setting the duty cycle of a switch mode regulator 301 such that it exerts zero control effort. For example, if switch mode regulator 301 is a buck regulator, this could involve leaving the switch in the buck regulator continuously ON, in other words, operating the buck regulator with a 100% duty cycle. For some other types of switch mode regulator 301, such as a boost regulator or a coupled coil regulator, this could involve leaving the switch in the converter continuously OFF, i.e., 0% duty cycle. It is possible that no switching will happens during this period in switch mode regulator 301, though it is important that current can flow from the receiving coil or coils 9 to the load without being inhibited by switch mode regulator 301. The linear mode regulator may be regulating the output voltage to the load 11 at this time.

While regulation with the switch mode regulator 301 is disabled, the backscatter communications channel can be turned on in step 804 and a message can be sent, in step 805.

Once the backscatter message is sent, the backscatter communications channel is turned OFF in step 806. Following this, in step 807, regulation by the switch mode regulator 301 is re-enabled and returns to operating in the first mode and the linear regulator 202 returns to exerting minimal control effort.

The inductive power receiver 3 can then wait again in step 802 for any messages that need to be sent.

Figure 9:
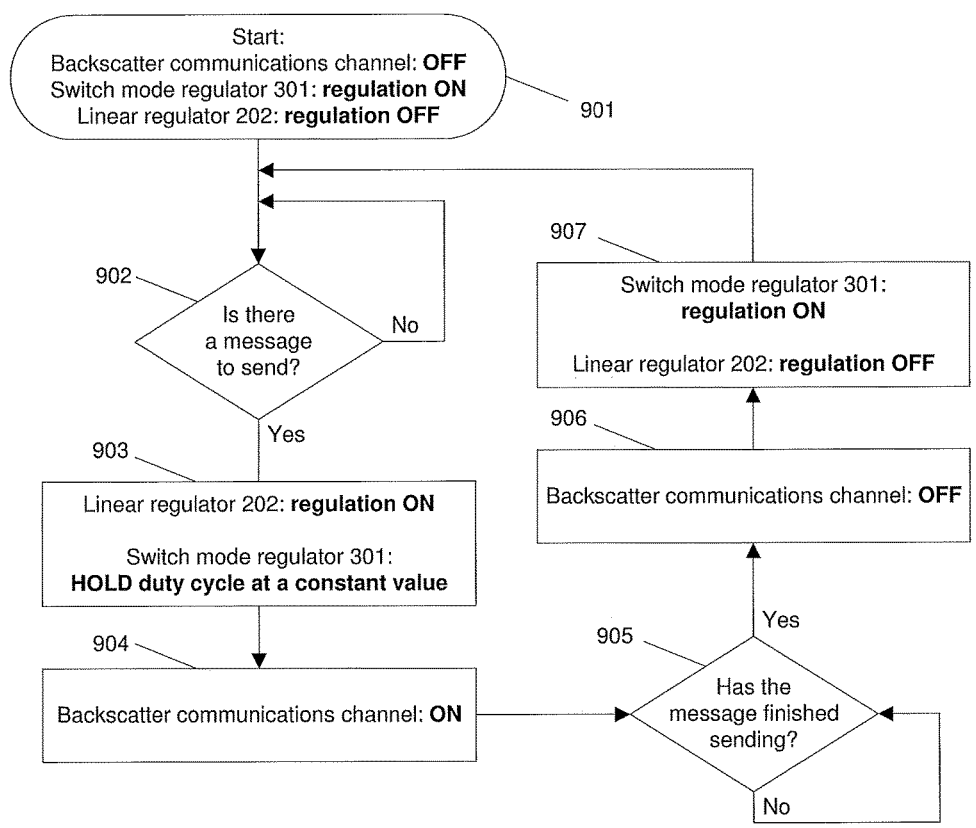
FIG. 9 is a flow diagram for a third regulator locking method

FIG. 9 shows a third control method for preventing the switch mode regulator 301 from affecting the backscatter communications channel. It follows these steps:

Initially, in step 901, while no messages are being sent on the backscatter communications channel, switch mode regulator 301 runs in a first mode, regulating the voltage or current delivered to load 11. Linear regulator 202 is exerting minimal control. The inductive power receiver 3 now waits in step 902 for any messages that need to be sent.

Immediately prior to sending a message on the backscatter communications channel, in step 903, switch mode regulator 301 begins to operate in a second mode wherein regulation is "frozen" or fixed. This can be achieved by setting the duty cycle of the switch mode regulator 301 such that it exerts a constant control effort. The duty cycle that the switch mode regulator 301 is held at can be the previous control effort prior that it was exerting prior to sending a message in step 902. Alternately, the duty cycle or control effort may be maintained at some other fixed value, for example to produce a pre-determined control effort. For example, if switch mode regulator 301 is a buck regulator, fixing the control effort could involve switching the switch in the buck regulator with a fixed duty cycle of 50%. The linear mode regulator may be regulating the output voltage to the load 11 at this time.

While regulation with the switch mode regulator 301 is operating with a fixed control effort, the backscatter communications channel can be turned on in step 904 and a message can be sent, in step 905.

Once the backscatter message is sent, the backscatter communications channel is turned OFF in step 906. Following this, in step 907, regulation by the switch mode regulator 301 is re-enabled and returns to operating in the first mode and the linear regulator 202 returns to exerting minimal control effort.

The inductive power receiver 3 can then wait again in step 902 for any messages that need to be sent.

Message corruption may also be avoided if, while sending a message on the backscatter communication channel, the control effort (eg. or the duty cycle is allowed to vary only slowly. For example, the duty cycle may only be allowed to vary no faster than at a fixed maximum rate of change, e.g., 1% change in duty cycle per millisecond, while a message is being sent.

Figure 10:
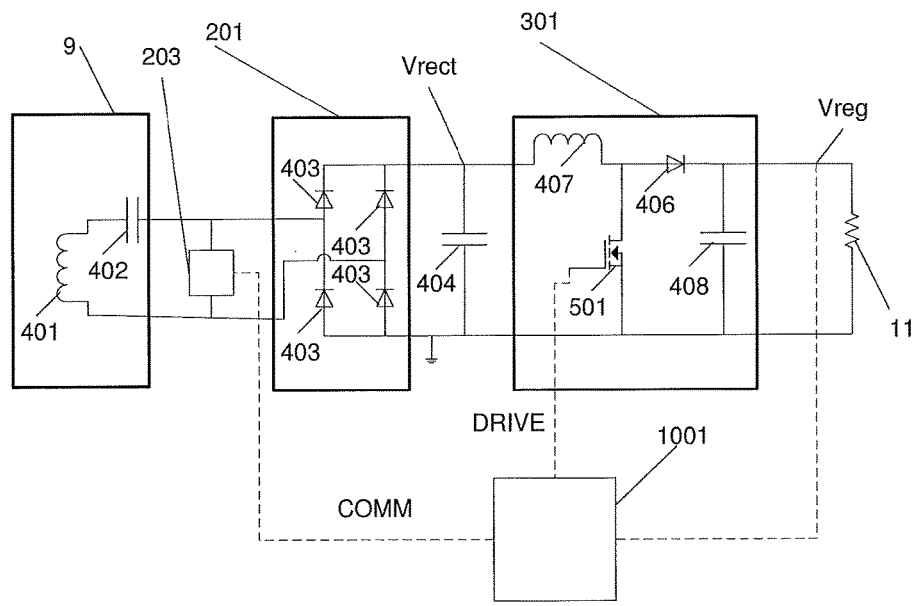
FIG. 10 is a circuit diagram of a receiver having a modified regulator drive controller.

FIG. 10 illustrates a further embodiment for preventing or reducing the effect of the switch mode regulator 301 on the backscatter communications channel in a receiver 3. This embodiment is described using a boost regulator as an example switch mode regulator 301, and largely corresponds to the circuit of FIG. 5. However any switch mode regulator type may alternatively be used. Also shown is the AC side modulator 203 as previously described, although alternatively or additionally a DC side regulator could be used. The embodiment does not include a linear regulator, although again this could alternatively also be included. A regulator drive controller 1001 provides the switching or drive (DRIVE) signal controlling operation of the MOSFET 501 of the boost regulator. The regulator drive controller is itself controlled using a feedback signal from the output of the switch mode regulator.

As will be appreciated by those skilled in the art, the duty cycle of the MOSFET 501 can be used to adjust the output voltage Vreg of the regulator 301. The output voltage is kept stable (regulated) using a feedback loop or path from the output of the regulator (Vreg) to the switching control (501) of the regulator. The feedback loop typically includes a control loop feedback controller such as a PID (proportional-integral-differential) controller which provides an input to a pulse width modulator (PWM) coupled to the MOSFET gate (501). The measured Vreg is compared against a wanted or set-point voltage Vset, and any difference is processed through the PID to generate an error signal (ERROR) which is used to adjust the duty cycle of the PWM. This represents a first or normal mode of operation in this embodiment. Whilst a PID controller is described in this embodiment, any suitable control loop feedback controller or mechanism may alternatively be used. Similarly whilst duty cycle control of the regulator is described, the feedback loop may be used to control other parameters such as frequency for example.

In this embodiment, the regulator drive controller adjusts this normal or first mode of operation when the AC (or DC) side modulator 203 is operational and sending a communication, to instead operate in a second mode. This is indicated using a signal (COMM) to the regulator drive controller, whereupon the controller causes the regulator to move from the first to a second mode of operation. In the second mode of operation the ERROR signal is modified to compensate for the effect of the AC (or DC) side modulator on the output of the regulator (Vreg).

Figure 11:
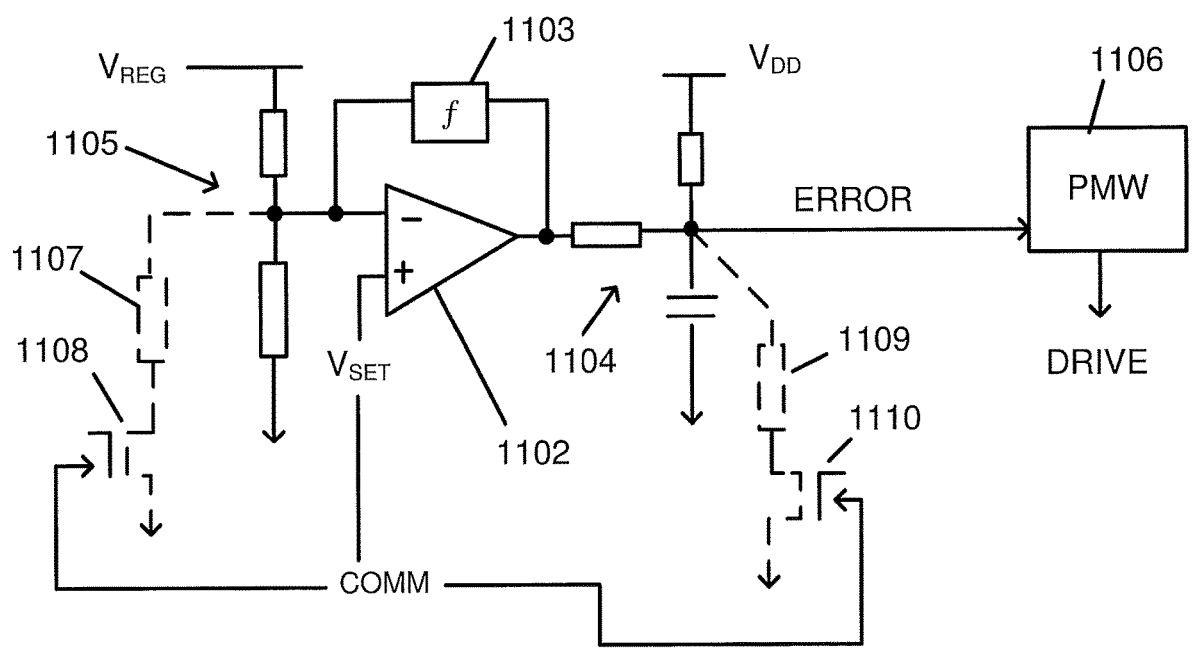
FIG. 11 is a circuit diagram of a modified regulator drive controller suitable for the receiver of FIG. 10.

FIG. 11 shows an example regulator drive controller having a PID controller circuit suitably modified in order to change an ERROR signal during the second mode. The PID controller includes a feedback network 1103 coupled between a first input (−) and an output of an op amp 1102. The first input is also coupled to an input voltage divider 1105 across the switch mode regulator output voltage Vreg. A second input (+) of the op amp 1102 is coupled to a set-point voltage Vset, and the output of the op amp 1102 is coupled to an output voltage network 1104 which provides the ERROR signal. The input voltage divider network 1005 and the output voltage network 1004 are not further described as examples of such networks will be well known to those skilled in the art. The ERROR signal is coupled to an input of the pulse width modulator 1105 which provides the DRIVE signal or pulses to switch the switch mode regulator. In this way the ERROR signal controls the duty cycle of the regulator switch(es) in order to maintain the regulator output voltage Vreg close to its set point; the ERROR signal itself being dependent on a regulated output of the receiver (Vreg). In an alternative embodiment, a regulated output of the receiver may be obtained from the output of the rectifier 201 (Vrect), for example when an AC side regulator is used such as that described with respect to FIG. 6.

Three mechanisms for adjusting the ERROR signal during the second mode to compensate for the effects of modulator operation are illustrated and described below. These mechanisms may be used individually or in combination.

The first mechanism utilises an additional resistor 1107 and switch 1108 network in the input voltage divider network 1105 in order to adjust the first input voltage to a first input (−) of the op amp. As noted above this first input voltage is derived from a regulated output of the receiver (Vreg or Vrect). The default state of the switch on the first mode can be open or closed depending on the design of the PID controller. The switch 1108 is arranged to close/open corresponding to the bit transitions of a packet when the AC or DC side modulator is communicating—the second mode. Thus for example the switch 1108 closes when modulator transitions to a "1" bit and opens when the modulator transitions to a "0" bit—these transitions being indicated by the COMM signal. In the example circuit arrangement shown (switch 1108 has an open default state), closing switch 1108 effectively decreases the first input voltage to the op amp, which in turn increases the ERROR signal voltage compared to what it would be during the first mode—depending on the comparison between Vreg and Vset. The change in ERROR signal will then cause a change on the duty cycle of the PWM which can either increase or decrease Vreg.

In the second mechanism of FIG. 11, the set point voltage Vset coupled to a second input (+) of the op amp (1102) is adjusted (as per bit transition of the whole message) during the second mode. This has the same effect as the first mechanism of changing or adjusting the ERROR signal compared to what it would have been during the first mode. In both the first and second mechanism, the ERROR signal still varies with any changes in the regulator output (Vreg) and so the feedback loop is still active, unlike in some of the previously described duty cycle locking embodiments. This has the advantage of responding to changes in regulated output, for example due to load changes, even during communications with the transmitter. The ERROR signal is still allowed to vary, however an additional component is added during the second mode to compensate for the effect of amplitude modulation of the regulator input voltage (ie the AC or DC side modulator).

In the third mechanism of FIG. 11, a resistor 1109 and switch 1110 are added to the output voltage network 1104. When switched in during the second mode, the additional resistor 1109 effectively decreases the output voltage of the op amp 1102. This changes the ERROR signal voltage which causes the PWM 1105 to change the duty cycle of the regulator switching. This in turn increases the output voltage Vreg of the switch mode regulator which compensates for the voltage reducing effect of operation of the modulator.

A typical adjustment or change of the first input, second input (Vset) or output voltage is around 5-10%. As previously noted a combination of these three mechanisms may be used in which case the percentage change during the second mode will be lower for each individually. Alternatively different mechanisms may be used to adjust the ERROR signal (or other feedback signal) during the second mode. For example the feedback parameter f in the feedback network 1101 may be changed, or a digital signal input to the PWM to increase or decrease the duty cycle by a predetermined percentage.

The above described embodiments are examples only, and many design factors may be varied as would be understood by those skilled in the art in order to increase or decrease (ie adjust) the ERROR signal during bit transitions of other communications by the receiver. For example some PWM will decrease duty when error is increased or vice versa. Similarly the input and output adjustment networks 1107, 1108, 1109, 1110 may be reversed to increase the ERROR signal when switched in. The skilled person will therefore appreciate that various alternative implementations may be constructed in order to cause a change in the control effort of the switch mode regulator (eg duty cycle, or frequency) corresponding to the bit transitions of the message.

Figure 12:
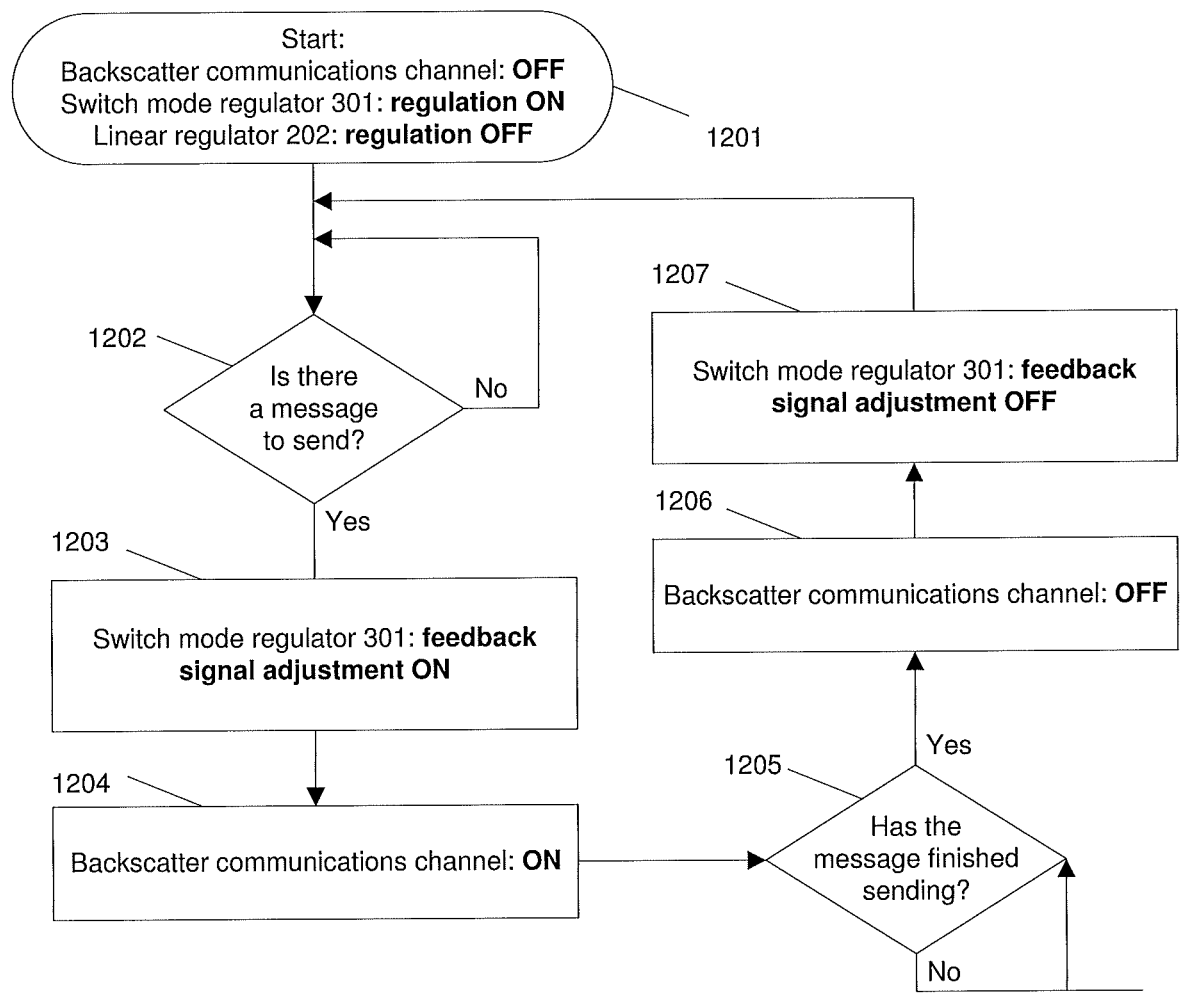
FIG. 12 is a flow diagram for a control effort adjustment method.

FIG. 12 shows a control effort adjustment method suitable for use with the embodiments described with respect to FIGS. 10 and 11. As with the previously described control methods this prevents or limits the switch mode regulator 301 from affecting the backscatter communications channel. It follows these steps:

Initially, in step 1201, while no messages are being sent on the backscatter communications channel, switch mode regulator 301 runs in a first mode, regulating the voltage or current delivered to load 11. The inductive power receiver 3 now waits in step 1202 for any messages that need to be sent. In this embodiment a message can be a single bit ("1" or "0"), or it may be a bit stream or packet where the entire packet may affect the switch mode regulator.

Immediately prior to sending a message (or one of a "1" or "0" bit) on the backscatter communications channel, in step 1203, switch mode regulator 301 begins to operate in a second mode wherein regulation is modified by adjusting the ERROR signal in the feedback loop. As discussed previously, this can be achieved by increasing or decreasing the input or output voltage settings in a PID controller or the set point voltage Vset, such that the switch mode regulator 301 control effort is adjusted. The duty cycle of the switch mode regulator 301 may be increased or decreased during transmitting of a bit by a modulator.

While regulation with the switch mode regulator 301 is operating with an adjusted control effort, the backscatter communications channel can be turned on in step 1204 and a message can be sent, in step 1205. The message may be a bit or a series of bits with the receiver operating in a second mode of the entire message or only for individual bits ("1" or "0").

Once the backscatter message is sent, the backscatter communications channel is turned OFF in step 906. Following this, in step 1207, regulation by the switch mode regulator 301 in the first mode is re-enabled and the ERROR signal is no longer adjusted.

The inductive power receiver 3 can then wait again in step 1202 for any further messages or bits that need to be sent.

In one embodiment, the inductive power receiver 3 spends on average 5% of time engaged in sending backscatter messages, spending 50 ms or less per message, and sends a message approximately once per second. In this embodiment, the switch mode regulator 301 is a coupled coil regulator. During these message sending periods, the duty cycle of the coupled coil regulator is 0%, which corresponds to minimum control effort on the current in and voltage across receiving coil or coils 9. In this embodiment, AC-side modulator 203 comprises a capacitor and switches and DC-side modulator 204 is not used.

Depending on the position and type of modulating circuit used, it can be necessary to disable synchronous rectification in the rectifier 201 while sending a message on the backscatter communications channel, in order to avoid shorting out the voltage present on the DC side of the rectifier 201. This is particularly important when AC side modulator 203 is used. This is not applicable where rectifier 201 is a simple diode rectifier.

In some implementations of inductive power transmitter 3, a circuit can perform both the function of regulator and the function of modulator. In this way, a regulator such as the switch mode regulator 301 or the linear mode regulator 202 may be used to modulate the backscatter communication channel in place of the AC-side modulator 203 and/or the DC-side modulator 204. Therefore, the regulator circuitry may partially or completely be shared with modulator circuitry. For example in addition to its regulation functions, switch mode regulator 301 may be used as a modulator, varying its duty cycle or control effort in order to modulate the power drawn from receiving coil or coils 9 in order to send a message on the backscatter communications channel. In a preferred embodiment, a regulator sending messages on the backscatter communications channel is digitally controlled.

It is understood that either or both of the inductive power transmitter 2 and the inductive power receiver 3 may be configured as an IPT transceiver, such that the modulation and demodulation circuits (or the modulator and the demodulator) may be provided as a unitary communications module in either or both of such transceivers, thereby allowing bi-directional communications.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power receiver comprising:
   a power receiving coil;
   a switch mode regulator that varies at least one of a switching duty cycle or a switching frequency to regulate at least one of an output voltage or an output current;
   a linear regulator that regulates at least one of an output voltage or an output current; and
   a modulator configured to communicate to an inductive power transmitter via the power receiving coil during one or more communicating periods and not communicate during one or more non-communicating periods, wherein:
      the switch mode regulator operates to control power flow from the power receiving coil during the non-communicating period and does not operate to control power flow from the power receiving coil during the communicating period; and
      the linear regulator operates to control power flow from the power receiving coil during the communicating period and does not operate to control power flow from the power receiving coil during the non-communicating period.

2. The receiver of claim 1 further comprising a bypass switch configured to bypass the switch mode regulator.

3. The receiver of claim 1 wherein the switch mode regulator operates with a substantially fixed control effort during the communicating period.

4. The receiver of claim 3 wherein the substantially fixed control effort is determined based on a duty cycle of the switch mode regulator in the non-communicating period.

5. The receiver of claim 1 wherein the switch mode regulator operates with a substantially 100% or substantially 0% duty cycle during the communicating period.

6. The receiver of claim 1 wherein the switch mode regulator operates with a maximum rate of change of a duty cycle or a range of duty cycle values during the communicating period.

7. The receiver of claim 6 wherein the maximum rate is 1% per millisecond.

8. The receiver of claim 1 wherein the linear regulator is a low dropout regulator.

9. The receiver of claim 1 wherein the linear regulator is configured to operate substantially as a closed switch during the non-communicating period.

10. The receiver of claim 1 further comprising a load disconnect switch.

11. The receiver of claim 1 wherein the switch mode regulator is a coupled coil regulator.

12. The receiver of claim 1 wherein the switch mode regulator is configured to provide an AC voltage in series with the power receiving coil to regulate AC power from the receiving coil.

13. The receiver of claim 1 wherein the modulator is configured to use amplitude modulation.

14. The receiver of claim 1 wherein components in the modulator are shared with components in the switch mode regulator.

15. The receiver of claim 1 wherein a control effort of the switch mode regulator is adjusted during the communicating period.

16. The receiver of claim 15, wherein the control effort is responsive to a regulated output of the receiver processed by a feedback path, and wherein during the communicating period the feedback path is modified.

17. The receiver of claim 15, wherein an error signal is determined by a comparison of an output voltage of the switch mode regulator and a set-point voltage, the error signal being used to control a duty cycle of the switch mode regulator, and wherein the error signal is increased or decreased during the communicating period.

18. The receiver of claim 15, further comprising a rectifier having a input arranged to receive a regulated output dependent on the switch mode regulator and an output to provide a rectified voltage, wherein an error signal is determined by a comparison of the rectified voltage and a set-point voltage, the error signal being used to control the switch mode regulator, and wherein the error signal is increased or decreased during the communicating period.

19. The inductive power receiver of claim 1, wherein the switch mode regulator is selected from the group consisting of: a buck regulator, a boost regulator, a buck-boost regulator, and a coupled coil regulator.

* * * * *